(12) United States Patent
Davis et al.

(10) Patent No.: US 11,787,103 B2
(45) Date of Patent: *Oct. 17, 2023

(54) CORE WITH IMPROVED CHUCK INTERACTION

(71) Applicant: Sonoco Development, Inc., Hartsville, SC (US)

(72) Inventors: Neil Roland Davis, Asheboro, NC (US); John Franklin Auten, Jr., Hartsville, SC (US); Michael Lee Thompson, Matthews, NC (US); Kevin Manly Kelley, Hartsville, SC (US); Xiaokai Niu, Hartsville, SC (US); David E. Rhodes, Hartsville, SC (US); Michael David Zold, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,730

(22) Filed: Feb. 28, 2022

(65) Prior Publication Data

US 2022/0250306 A1 Aug. 11, 2022

Related U.S. Application Data

(63) Continuation of application No. 16/291,112, filed on Mar. 4, 2019, now Pat. No. 11,279,077.

(51) Int. Cl.
*B29C 53/82* (2006.01)
*B29C 33/38* (2006.01)
*B65H 75/02* (2006.01)
*B65H 75/10* (2006.01)

(52) U.S. Cl.
CPC ........ *B29C 53/825* (2013.01); *B29C 33/3842* (2013.01); *B65H 75/02* (2013.01); *B65H 75/10* (2013.01)

(58) Field of Classification Search
None
See application file for complete search history.

(56) References Cited

U.S. PATENT DOCUMENTS

| | | | |
|---|---|---|---|
| 1,122,627 A | 12/1914 | Samuel | |
| 2,922,343 A * | 1/1960 | Dunlap, Jr. | ............... B31C 3/00 493/272 |
| 3,002,433 A * | 10/1961 | Dunlap | ................. B29C 66/116 138/144 |
| 3,070,281 A | 12/1962 | Durkin et al. | |
| 3,432,112 A | 3/1969 | Clement | |
| 3,731,437 A * | 5/1973 | Ewell | ..................... B24D 9/006 451/535 |
| 3,792,868 A | 2/1974 | Flagg | |
| 4,519,620 A | 5/1985 | Keith | |

(Continued)

*Primary Examiner* — William A. Rivera
(74) *Attorney, Agent, or Firm* — von Briesen & Roper, s.c.

(57) ABSTRACT

An improved core for mounting on one or more core engaging elements such as a pair of chucks and a method of making an improved core are provided. The core is adapted to wind and unwind material thereon. The core may comprise a high coefficient of friction coating disposed on the inner surface of the core to improve the core-chuck interaction. The inner surface may be mechanically or chemically treated to improve core-chuck interaction.

20 Claims, 11 Drawing Sheets

(56) References Cited

U.S. PATENT DOCUMENTS

| | | |
|---|---|---|
| 4,957,270 A | 9/1990 | Rummage et al. |
| 5,379,648 A | 1/1995 | Tiffin |
| 5,786,077 A | 7/1998 | McLaughlin |
| 6,050,148 A | 4/2000 | Staples et al. |
| 6,416,014 B2 | 7/2002 | Van Deurse |
| 7,344,104 B2 | 3/2008 | Hada et al. |
| 7,712,487 B2 | 5/2010 | van de Camp |
| 11,279,077 B2 * | 3/2022 | Davis .................... B65H 75/10 |
| 2002/0084378 A1 | 7/2002 | Gerhardt et al. |
| 2002/0092284 A1 | 7/2002 | Basse et al. |
| 2005/0069665 A1 | 3/2005 | Butler |
| 2005/0098679 A1 | 5/2005 | Van De Camp |
| 2005/0184191 A1 | 8/2005 | Van De Camp |
| 2006/0151663 A1 | 7/2006 | Bessems et al. |
| 2006/0163420 A1 | 7/2006 | Camp |
| 2007/0184275 A1 | 8/2007 | Gilman |
| 2011/0133015 A1 | 6/2011 | Gelli et al. |

* cited by examiner

CORE WITH IMPROVED CHUCK INTERACTION

CROSS REFERENCE TO RELATED APPLICATION

This application is a continuation of U.S. application Ser. No. 16/291,112, filed Mar. 4, 2019. U.S. application Ser. No. 16/291,112 is incorporated here by reference in its entirety to provide continuity of disclosure.

BACKGROUND

Field of The Invention

This patent relates to a core around which sheet or strand material can be wound. More particularly, this patent relates to a winding core having improved interaction with core engaging elements such as chucks or shafts to reduce damage to the core.

Description of the Related Art

Web materials such as polymer film, paper, nonwoven or woven textile, metal foil, sheet metal, and others, are used to manufacture a variety of products. The web materials are generally provided in the form of large rolls or coils formed by winding the web material about a winding core. The core is generally paperboard, though it may be reinforced with a plastic outer shell or the like. The paperboard core may be formed of low, medium or high strength paperboard plies.

A roll of paper or the like wound onto the core typically has a weight above a half ton and can exceed five tons. Typical core sizes are a nominal internal diameter (ID) of 3 in. to 8 in. (76.2 mm to 203.2 mm) and a length of about 11 to 170 inches (about 279.4 mm to 4,318 mm). Other cores, such as typical cores for the tissue industry can have internal diameters ranging from 3 in. to 23 in. (76.2 mm to 584.2 mm). While cores for carrying sheet metal, can have IDs ranging from 3 in. to 27.5 in. (76.2 mm to 700 mm).

To begin the winding process, a leading edge of a web is attached to the winding core and the core is rotated about its axis to wind the web into a roll. The rolls are subsequently unwound during a converting or similar process.

Web converters continually strive to increase productivity of converting processes by increasing the total amount of web throughput per unit time. To this end, there has been a continual push toward higher web speeds, roll widths and roll weights, which leads to winding cores that must rotate at higher rotational demands. Thus, paper converting can place extreme demands on the stability of current winding cores.

During a winding or unwinding operation, a core is typically mounted on a rotating expandable chuck that is inserted into each end of the core and expanded to grip the inside of the core so that the core tends not to slip relative to the chucks as torque is applied therebetween. Typically, the rotation of the core is achieved by means of a drive coupled to one or both of the chucks, and the core is rotated to achieve web speeds of, for example, 800 fpm to 1500 fpm (4.1 m/s to 7.6 m/s) or more. The chucks generate torque (rotational force) on the core as they rotate the core during a winding operation. Torque also can be generated by the web during an unwinding operation, and by braking tension applied to the core by the chucks or other core engaging elements.

Currently in many winding and unwinding (converting) operations, cores are used in combination with chucks that have smooth expanding elements. These smooth expanding elements do not always engage the core properly, or the maximum torque transmission is exceeded, and as a result, the chuck will break free and slip inside the core. When the slippage is excessive, the ends of the core that contact the chucks can be damaged or destroyed, the material carried on the core cannot be used, and the speed of the converting process is negatively impacted. Debris generated during unwanted slippage can also cause chuck performance and maintenance issues. Even a mild case of slippage can lead to reduced throughput, lower converting speeds and causing an excessive waste of material. The present disclosure addresses these needs.

SUMMARY OF THE INVENTION

The present disclosure relates to an improved core for mounting on core engaging elements such as a shaft or a pair of chucks, and a method of making an improved core. The core is adapted to wind and unwind material thereon.

In one aspect the disclosure relates to an improved core for mounting on one or more core engaging elements. The core preferably is hollow and cylindrical and has two axially opposed ends. The core comprises an inner surface and an outer surface adapted for winding and unwinding material thereon. The core may be made of wound paper. The improvement comprises a high coefficient of friction (COF) coating disposed on all or a portion of the inner surface. The high COF coating is adapted to increase the coefficient of friction (COF) between the inner surface of the core and the core engaging elements. The coating may be a liquid, a powder or any suitable material that reacts to increase the COF of the inner surface of the core when placed between the core and the core engaging elements.

In another aspect the disclosure relates to an improved fiber based core wherein the one or more inner plies are made of a specialty material that improves interaction between the core and the core engaging elements such as chucks or a shaft. The specialty material can be a high COF, anti-skid paper or a paper having other properties designed to improve interaction between the core and the core engaging elements.

In still another aspect the disclosure relates to an improved core in which the inner surface of the core has been mechanically or chemically treated to improve core-chuck interaction. For example, the inner surface of the core may be altered by mechanical abrasion or chemical treatment to increase the roughness of the inner surface.

In yet another aspect the disclosure relates to a method of making a hollow cylindrical core. The core has an inner surface and an outer surface adapted to accommodate a wound material and two axially opposed ends. The method may comprise the steps of spirally winding one or more inner plies around a forming mandrel to form an inner surface of the core; spirally winding one or more additional plies around the forming mandrel to form a core, and applying a high COF coating onto at least a portion of the inner surface.

THE DRAWINGS

DETAILED DESCRIPTION OF THE INVENTION

Figure 1:
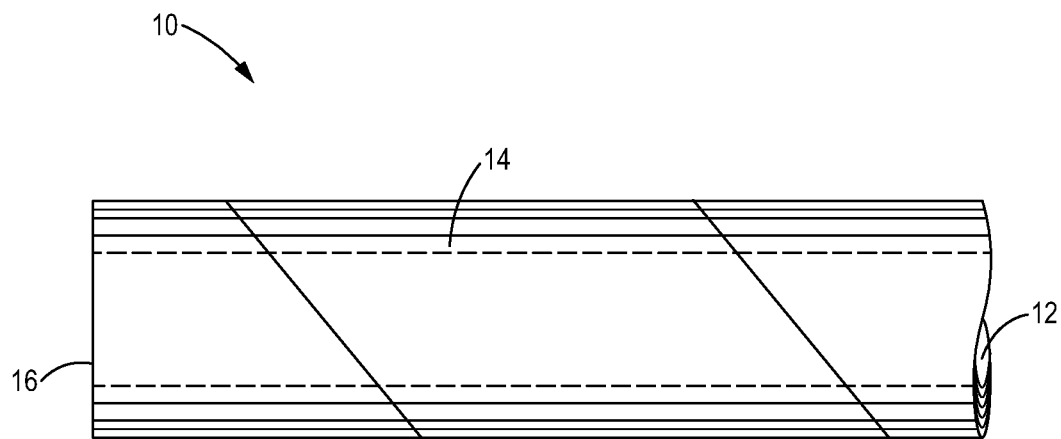
FIG. 1 is a perspective view of a portion of a core used for carrying material thereon.

While this invention may be embodied in many forms, there is shown in the drawings and will herein be described in detail one or more embodiments with the understanding that this disclosure is to be considered an exemplification of the principles of the invention and is not intended to limit the invention to the illustrated embodiments.

Terminology

The following definitions are intended for the ease of understanding of the disclosure and are not intended to be limiting.

Arbor: A shaft or axle upon which a sheet may be wound.

Coating: When used herein as a verb, the word "coating" may refer to any suitable means of applying a material onto a surface. When used herein as a noun, the word "coating" may refer to any suitable material applied to a surface, such as the inner surface of a core, including without limitation liquids, powders, compounds, mixtures and treatments.

Coefficient of Friction (abbreviated COF, CoF or Cof): As used herein, coefficient of friction generally means the frictional force between a core and the core engaging elements when the two are stationary.

Core: A cylindrical structure, usually hollow, for carrying sheet or strand material thereon. The core may be made of fiber (such as wound paper), plastic, metal or any suitable material. Sometimes referred to as a tube or spool. The cores described herein may be used to hold and dispense any suitable material, including without limitation paperboard (such as for use in making packaging, sheet grade paper, and tissue grade paper), metal sheets, plastic films and textiles.

Chew Out: Damage to the inner surface of a core caused during a winding or, especially, an unwinding operation when the core engaging elements rotate independently of the core. Chew out usually happens when maximum torque is exceeded.

Core engaging elements: The structure or structures that engage (contact) the core to hold the core during winding and unwinding operations. May include without limitation chucks, solid shafts, differential shafts and arbors, either with or without expanding elements.

Engaging surface(s): The surface(s) on the inner surface of the core that engage (contact) the core engaging elements.

High-COF: The term "High-COF" (or "High COF") is used herein to describe a coating or other composition that tends to increase the COF between two surfaces, such an the inner surface of a core and the core engaging elements.

Maximum torque: The amount of torque that can be applied to a core before slippage (between the core and the core engaging elements) occurs.

Recoiler: A machine used to wind sheet material, particularly metal sheets, onto a core or spool.

Shafts: In contrast to chucks, shafts generally extend through the entire length of the core to hold the core. Differential shafts are shafts having sections that can rotate at different rotational speeds.

Torque: As used herein, torque generally means the rotational force applied to a core. Torque can be generated by driving forces applied to the core engaging elements as they rotate the core during a winding operation. Torque also can be generated by the web during an unwinding operation, and by braking forces applied to the core engaging elements.

The Core

Turning to the drawings, there is shown in FIG. 1 a perspective view of a portion of a core 10 used for carrying material 100 thereon. The material 100 can be any suitable strand or sheet material such as but not limited to paper, film and textiles. The core 10 may comprise spirally wound paper (such as in fiber based cores) and has an inner surface 12 and an outer surface 14. The core 10 extends longitudinally (axially) between two ends 16 and may be any suitable length.

Apparatus 30 for Making a Core 10

Figure 2:
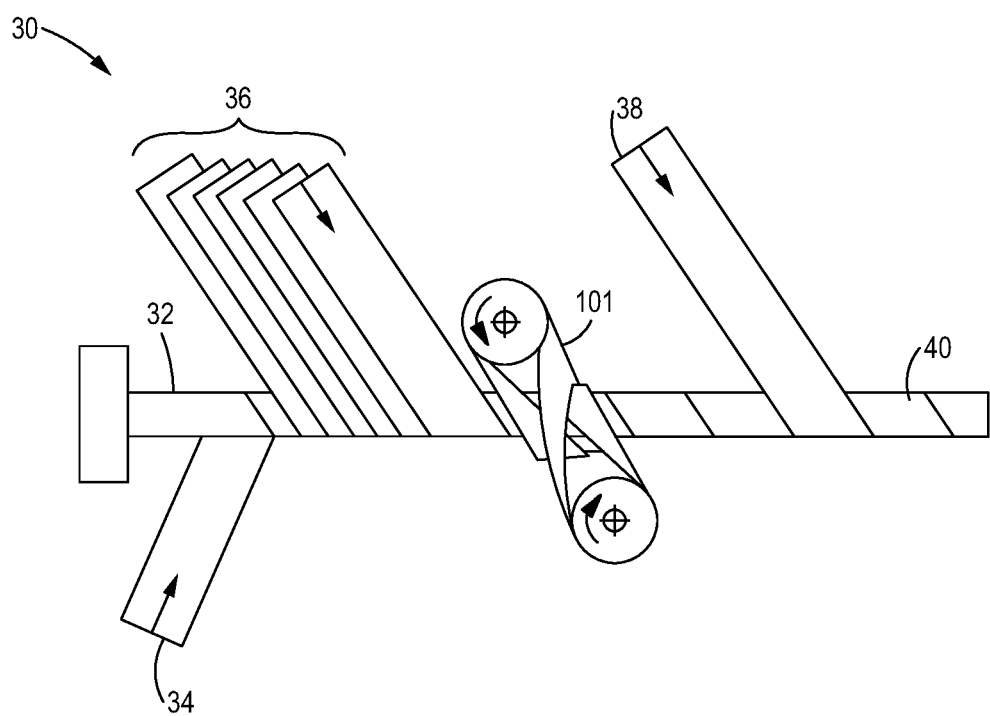
FIG. 2 is a partial plan view of an apparatus for making a core such as the core of FIG. 1.

FIG. 2 a partial plan view of an apparatus 30 for making a core such as the core 10 of FIG. 1. In general, the core 10 may be formed by spirally (or convolutely) winding a plurality of fiber based plies about a mandrel 32, adhering the plies together, and severing portions or sections of the continuous core as it comes off the mandrel 32 to form individual cores 10. The plies are drawn from respective creels (not shown) and routed along a path to the mandrel 32. Each ply may have an adhesive applied to it at an adhesive applying station (not shown) such as a glue pot for adhering to adjacent plies.

In the illustrated apparatus, an inner ply 34 is applied to the mandrel 32 and spirally wound to form the inner layers of the core. Downstream from the inner ply 34, a plurality of intermediate or body plies 36 are applied on top of the inner ply 34 and spirally wound to form an intermediate zone of the core 10. After applying the last intermediate layer 36 and forming the intermediate zone, one or more outer plies 38 are applied on top of the intermediate zone and spirally wound to form an outer zone of the continuous core 40. A cut-off station (not shown) may be included to cut the continuous core 40 into discrete lengths to form individual cores 10.

A winding belt 101 may be used to rotate the continuous core 40 in a screw fashion such that the continuous core 40 advances down the mandrel 32. To facilitate movement of the continuous core 40 along the stationary mandrel 32, a lubricant may be applied to the inner surface of the innermost ply 34 using a lubricating station (not shown). The lubricant may be any suitable lubricant, including but not limited to a waxy solid, a liquid or a powder.

Paper Converting Apparatus

Figure 3:
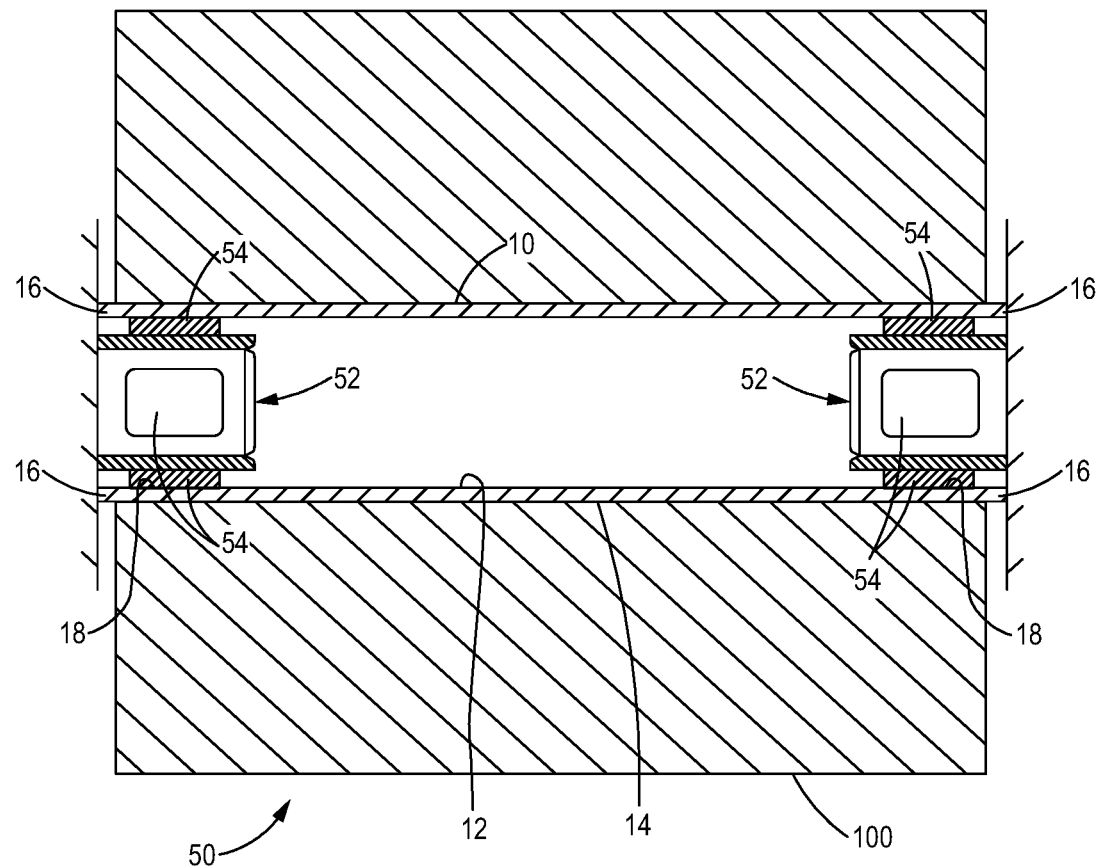
FIG. 3 is a cross-sectional side view of a core carrying wound material and mounted on chucks.

FIG. 3 is a cross-sectional side view of a portion of a paper converting apparatus 50, including a core 10 mounted on two chucks 52. The core 10 has an inner surface 12 that engages the chucks 52 and an outer surface 14 that carries wound material 100 such as paper, plastic film or metal foil. The chucks 52 are located at either end 16 of the core 10 and have expandable elements 54 (sometimes referred to as "jaws") that engage engaging surfaces 18 of the core 10. The engaging surfaces 18 are located at each end 16 of the core 10 and are part of the inner surface 12 of the core 10.

Chucks come in numerous types and geometries. Some chucks are substantially cylindrical and some have cone-like extensions. As noted above, many chucks have expandable elements that engage the inner surface 12 of the core 10.

The inner surface 12 is typically a paperboard material, although the inner surface 12 could be any suitable material for the core 10. Typically, the paperboard material has a density of between about 0.58 g/cm$^3$ to about 0.7 g/cm$^3$, but the density can and sometimes does fall outside this range. The core 10 could be a "heterogeneous" tube wherein different materials (such as different grades of paper) form different parts (typically layers) of the core 10, or it may be a "homogeneous" tube wherein the entire core wall is formed of a single type of material, which is typical of most paperboard winding cores.

A typical outer diameter of the winding core 10 may be about 7.105 in. (180.5 mm) and a typical inner diameter of the core 10 may be about 5.917 in. (150.5 mm). Winding cores typically come in standard diameters to accommodate uniform tooling, but it should be understood that the winding core may have various dimensions for both the inner and outer diameters of the core 10, as well as the thickness of the core 10. The length of the core 10 in one embodiment is about 170 in. (4.32 m), while typical core lengths range from 11 in. (239.4 mm) to 140 in. (3.56 m). However, it should be understood that the core 10 could be any suitable dimensions depending on the specific web material being wound or other factors.

Figure 4:
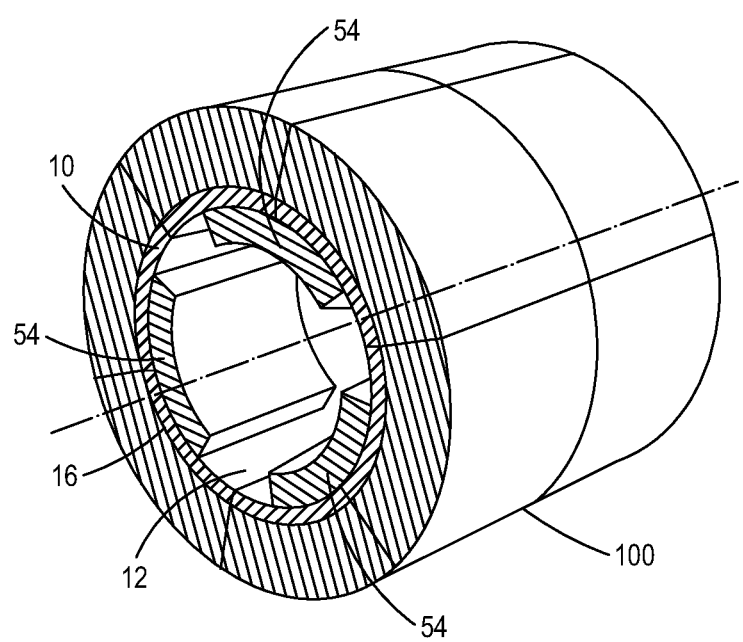
FIG. 4 is a perspective schematic view of one end of the core of FIG. 3 with the body portion of the chuck removed to better show the expandable elements.

FIG. 4 is a perspective schematic view of one end 16 of the core 10 of FIG. 3 with the body portion of the chuck 52 removed for clarity. The chuck 52 in FIGS. 3 and 4 includes three expandable elements 54. Each expandable element 54 is capable of expanding radially outward from the chuck body. The expandable elements 54 may be arranged about the entire circumference of the chuck 52. Thus, the expandable elements 54 may be spaced uniformly about the entire inner circumference of the core 10.

In an embodiment where the core 10 is about 4.32 m. in length, a roll of paper 100 wound on the core 10 can approach a weight of 7 tons. The expandable elements 54 on each chuck 52 located at the top of the core 10 support the weight of the winding core 10 in addition to the weight of the web material 100 that is wound on the winding core 10 at any given time. Consequently, the expandable elements 54 are capable of producing a substantial amount of force on the core 10 to both rotate and support the winding core 10.

Torque may be applied to the core inner surface 12 in a number of ways and at different times during winding and unwinding operations. In a winding operation, one or both chucks 52 may be coupled to a motor or the like to drive the core 10 in rotation to wind the web 100 around the core 10. This driving action applies torque to the core inner surface 12.

The chucks 52 also may apply torque to the core inner surface 12 during an unwinding operation. When unwinding material 100 from the core 10 during, for example, a paper converting operation, the expandable elements 54 engage the engaging surfaces 18 of the core 10, applying a pressure to hold the core 10 in rotational engagement. In a paper converting operation such as that shown in FIG. 3, the web 100 may be unwound from the core 10 via a machine driven apparatus not shown in FIG. 3. During unwinding at least one chuck 52 is coupled to a brake (not shown) that acts to slow or stop the winding core 10 from rotating. The core 10 is typically rotated at peripheral speeds of 4.1 m/s to 7.6 m/s, although various other speeds, including much higher speeds, may be employed. It is possible that during an unwinding operation the web itself may cause torque as it is pulled off the roll.

Although the chucks 52 shown in FIG. 3 include expandable elements 54, it should be understood that the chucks 52 could have other configurations and may alternatively not expand hydraulically, but rather expand pneumatically or mechanically inside the hollow of the core 10, as is known by those skilled in the art. The expandable elements 54 may also have different designs, sizes and shapes to accommodate different winding cores 10 or a specific winding/unwinding application. Different types and sizes of chucks 52 could also be implemented for different sized winding cores 10 or for different types of winding core materials.

Figure 5:
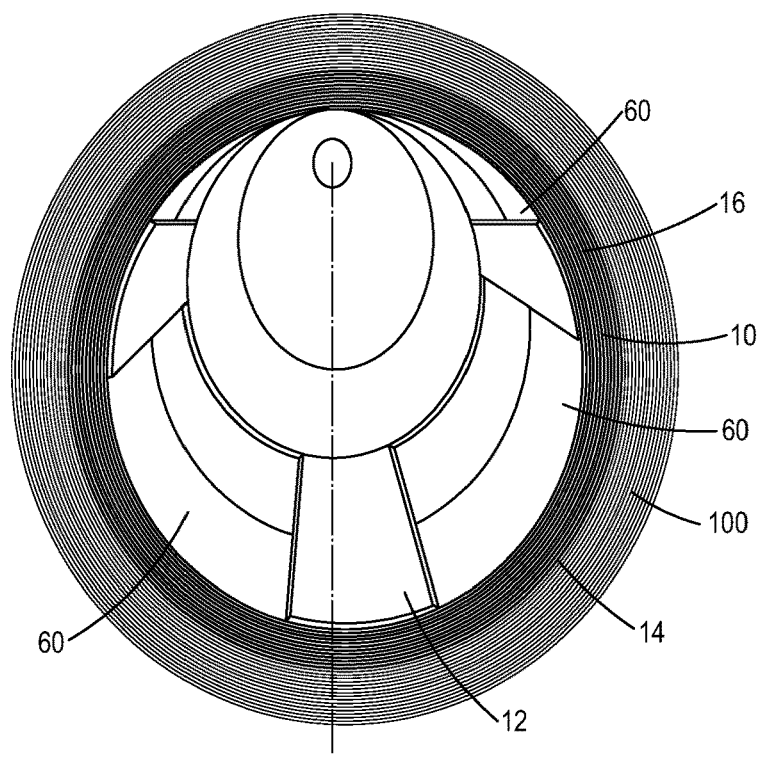
FIG. 5 is a perspective end view of a core showing indentations caused by the expandable elements.

The expandable elements 54 can impart very high forces on the core 10. FIG. 5 is a perspective end view of a core 10 after a partial unwinding operation. The ID (inner surface 12) of the core 10 bears visible impressions/indentations 60 caused by pressure exerted on the core 10 by the expandable chuck elements 54, but otherwise is basically undamaged. These indentations are a function of the radial force applied to the core 10 by the expandable elements 54, as well as the grade, density and hardness of the paper used.

As the torque on the core inner surface 12 increases, the likelihood of slippage between the core 10 and the chucks 52 increases. Testing on cores with a 4 inch (10.16 CM) internal diameter indicated that typical cores tested with one particular chuck can withstand a torque force of 350-400 lbf-ft (475-542 N-m) prior to slippage, and some cores can withstand much higher torque forces. Chucks have been designed to mitigate slippage by, for example, designing expandable elements 54 to increase the contact area between the expandable elements 54 and the core 10 and more particularly, the engaging surfaces 18 of the core inner surface 12.

Core Damage

Figure 6:
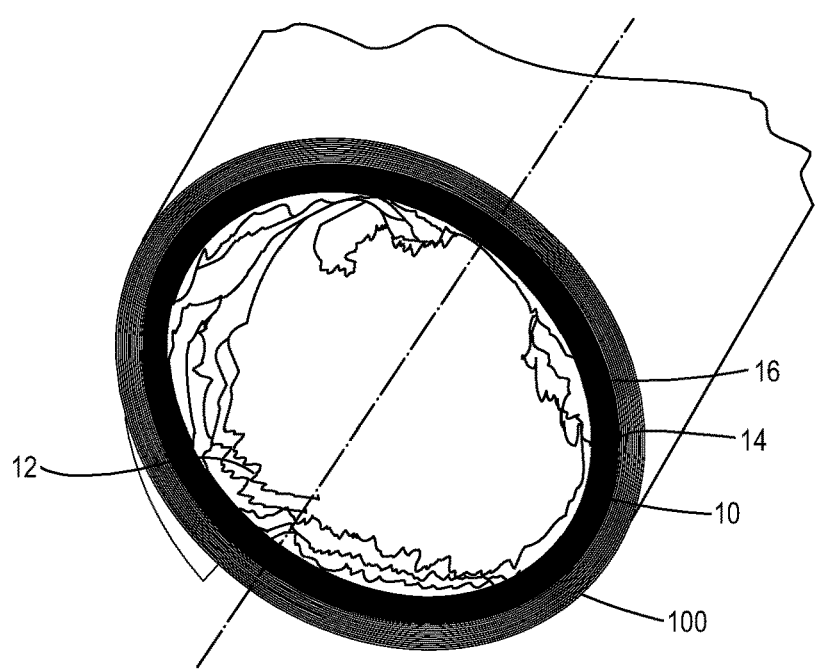
FIG. 6 is a perspective end view of a core showing damage to the inner surface of the core caused by slippage of the core with respect to the chuck.

FIG. 6 is a perspective end view of another core 10 after a partial unwinding operation. During the unwinding operation, torque on the core 10 increased to the point where the chuck 52 rotated independently of the core 10 and damaged the inner surface 12 of the core 10.

This damage may involve multiple inner plies, and is sometimes referred to as "chew out." Slippage can also result in "burnout", wherein the friction caused by the chucks 52 against the core 10 burns or scorches the core 10, rendering it unsuitable for further use.

When chew out (or burnout) occurs, the user can't control the web of material 100 coming off the core 10, which can require slowing or shutting down the paper converting operation and adjusting the core-chuck interface. Sometimes the user will place a shim or other device between the core 10 and the chucks 52 to try to eliminate further slippage, web breaks, vibration or other converting issues resulting from chuck slippage and/or core chew-out. Sometimes the user must run at a lower speed to try to avoid slippage. Also, sometimes the user will splice the web to a new roll of paper early. Repeated slippage can cause the user to splice out of rolls prematurely.

Mitigating Core Damage

An overall method of mitigating slippage and the damage it can cause is to change the coefficient of friction (COF) between the inner surface 12 of the core 10 and the core engaging elements. COF, often represented by the variable μ, may be represented by the following formula:

$$\mu = (F_f / F_n) \quad (1)$$

where:

μ=the coefficient of friction, or COF (dimensionless);

$F_f$=the frictional force exerted by one surface as it moves across another surface (in Newtons); and $F_n$=the force applied normal to the frictional force (in Newtons).

There are two kinds of μ, static and kinetic. In the discussion that follows, μ (or COF) is generally the static μ (or static COF). It should be understood that, while the processes disclosed herein generally increase static μ, they also generally increase kinetic μ as well.

The COF between the inner surface 12 of the core 10 and the chucks 52 is a function of many variables, some of which can be controlled to improve the core-chuck interaction and thus mitigate damage to the core 10. There have been developed and will now be described various improved cores as well as methods of improving core-chuck interaction.

(i) Mitigating Core Damage Using a High COF Coating

In one aspect a core 10 and method of making a core 10 involves using a high COF material ("coating") 70 that is applied or otherwise disposed on the inner surface 12 of the core 10. The high COF coating 70 is adapted to increase the coefficient of friction (COF) between the inner surface of the core 10 and the core engaging elements such as the chucks 52. The coating 70 may be applied over the lubricant (if present) and/or directly onto the "bare" inner surface of the core 10.

Figure 7:
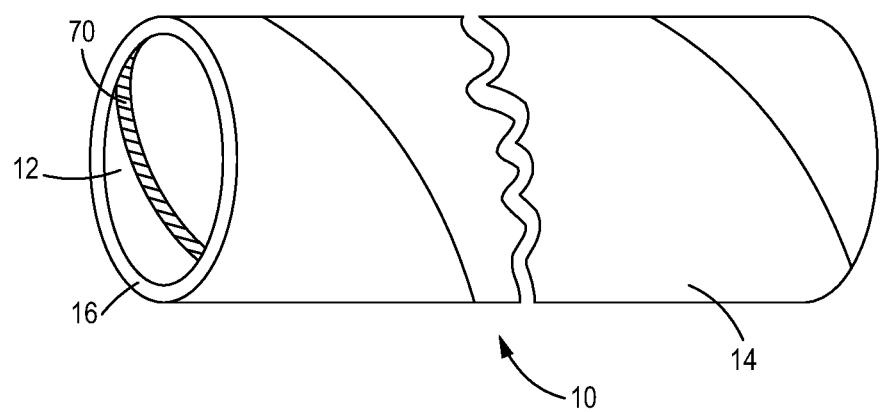
FIG. 7 is a perspective end view of a core after a coating has been applied to the inner surface in a spiral pattern.

FIG. 7 is a perspective view of a core 10 after a high COF coating 70 has been applied to a portion of the inner surface 12. As explained further below, the high COF coating 70 may be applied in any suitable pattern and to all or less than all of the engaging surfaces 18 of the core 10.

Figure 8:
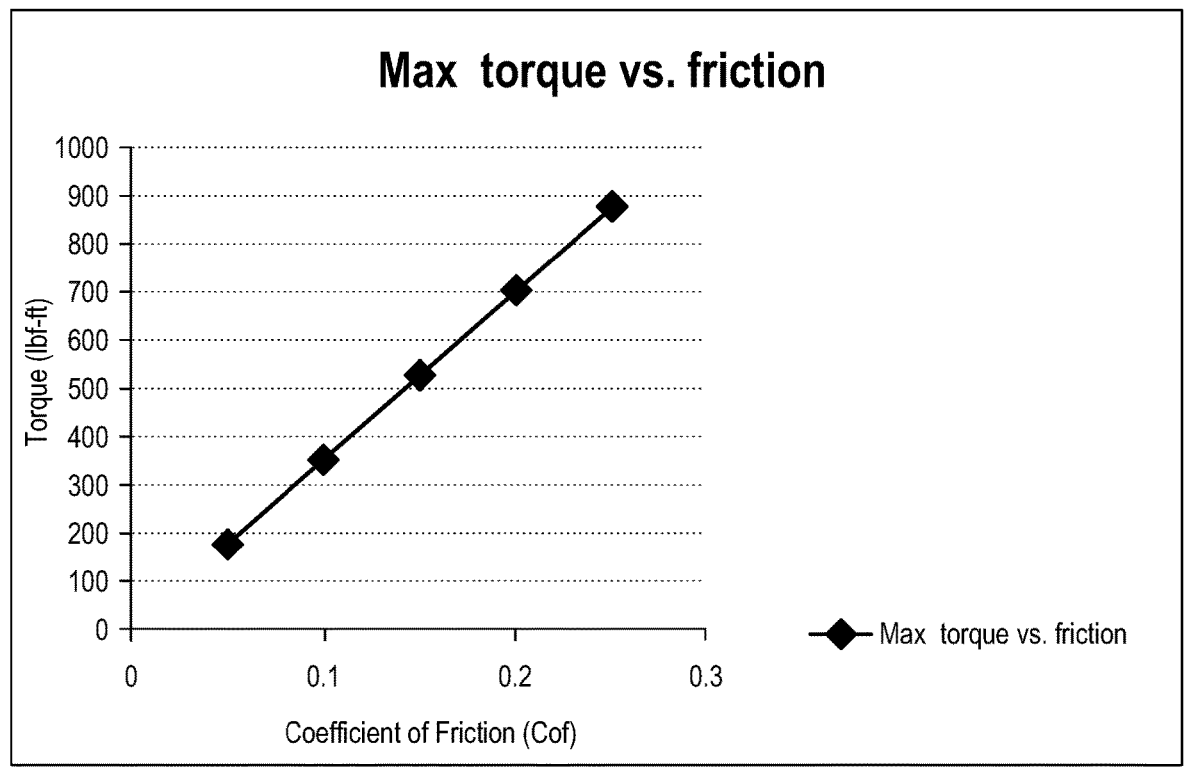
FIG. 8 is a graph showing the relationship between maximum torque and coefficient of friction.

FIG. 8 is a graph showing the relationship between maximum torque and the coefficient of friction (COF) between the core and the core engaging elements. The data in FIG. 8, obtained using finite element analysis (FEA), shows that maximum torque increases as COF increases.

Increasing the COF between the inner surface 12 of the core 10 and the core engaging elements (such as chucks 52) increases maximum torque, that is, the amount of torque (rotational force) that can be applied to the core 10 by the chucks 52 before slippage occurs. In other words, adding a high COF coating 70 to the inner surface 12 of the core 10 causes the chucks 52 to better grip the core 10.

Figure 9:
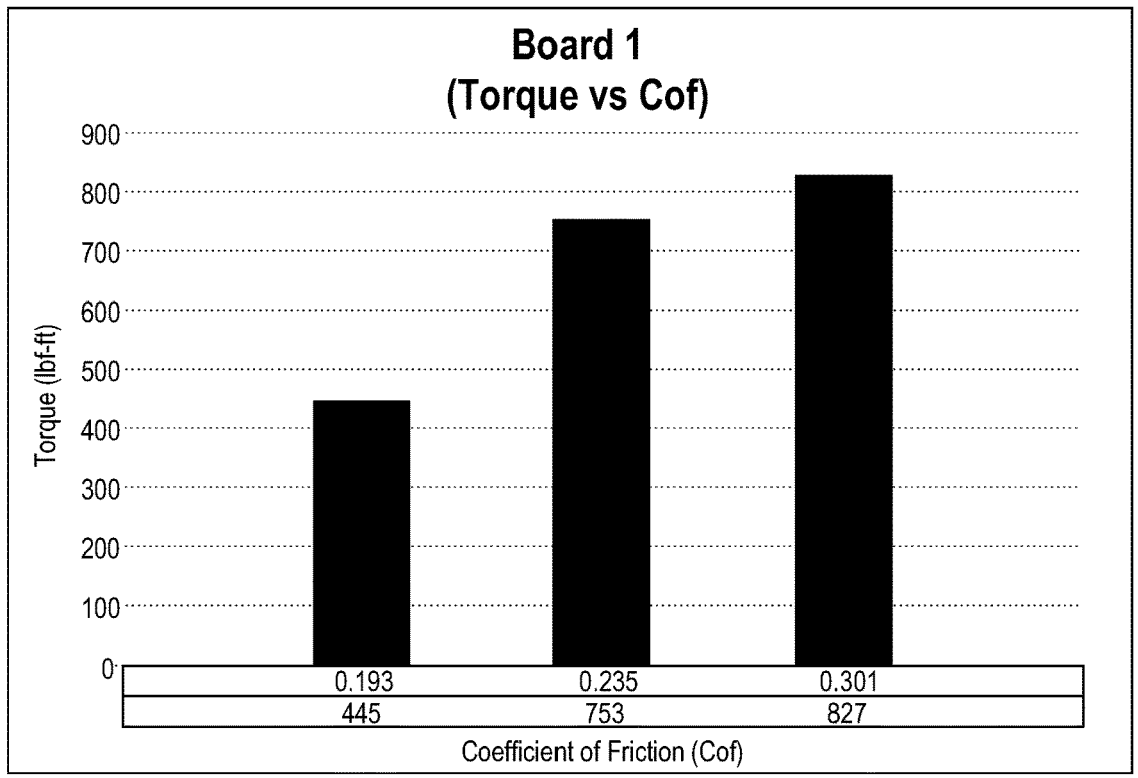
FIG. 9 is a graph showing the relationship between maximum torque and coefficient of friction for a first paperboard.

FIG. 9 is a graph showing the effect of the COF (between the inner surface 12 of a core 10 and the core engaging elements 52) upon the maximum torque for a core 10 having an inner ply 34 made from a first grade of paperboard (designated "Board 1"). As FIG. 9 shows, maximum torque generally increased with the COF. Here is the same data in table form:

|  | Coefficient of Friction | | |
| --- | --- | --- | --- |
|  | 0.193 | 0.235 | 0.301 |
| Torque (lbf-ft) | 445 | 753 | 827 |
| Torque (N-m) | 603 | 1021 | 1121 |

Figure 10:
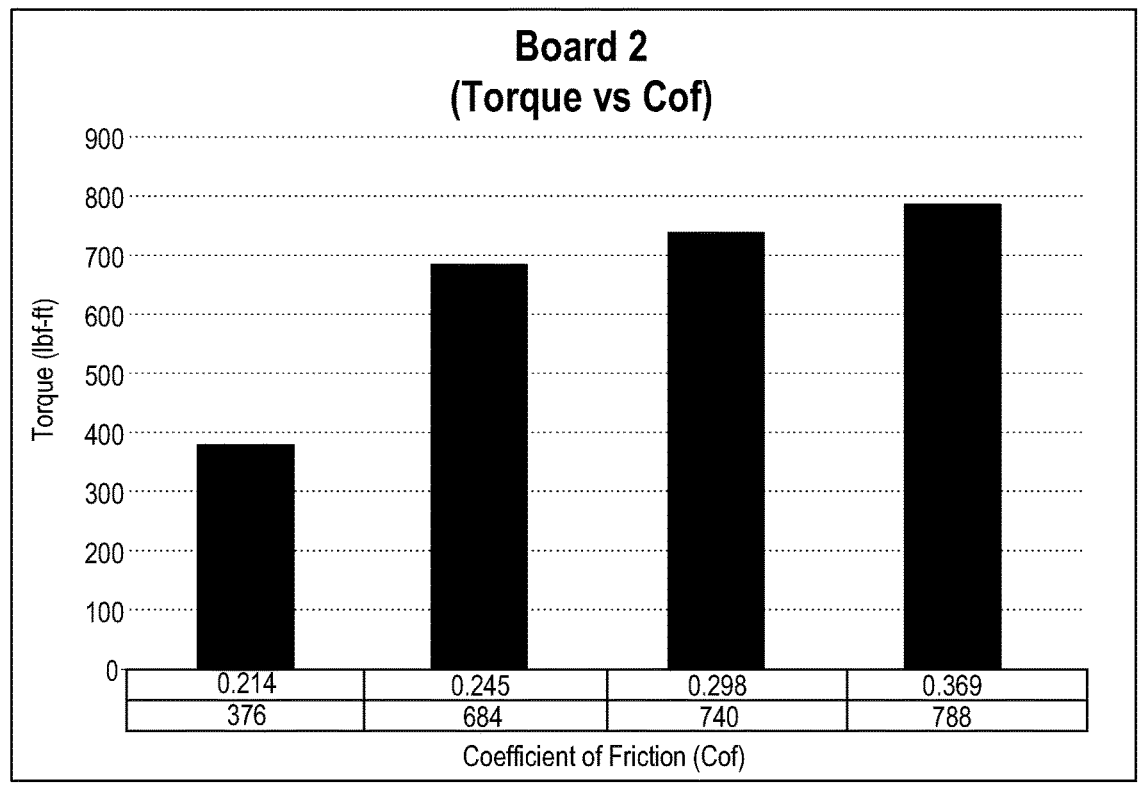
FIG. 10 is a graph showing the relationship between maximum torque and coefficient of friction for a second paperboard.

FIG. 10 is a graph showing the effect of the COF (between the inner surface 12 of a core 10 and the core engaging elements 52) upon the maximum torque for a core 10 having an inner ply 34 made from a second grade of paperboard (designated "Board 2"). Again, torque generally increased with COF. Here is the same data in table form:

|  | Coefficient of Friction | | | |
| --- | --- | --- | --- | --- |
|  | 0.214 | 0.245 | 0.298 | 0.369 |
| Torque (lbf-ft) | 376 | 684 | 740 | 788 |
| Torque (N-m) | 510 | 927 | 1003 | 1068 |

(a) Types of Coatings

The high COF coating may be any suitable material that increases the COF of the core 10 and the core engaging elements 52. The coating 70 may be applied in the form of a liquid, powder, slurry or any suitable physical form. The coating 70 may be suitable for use with most if not all chuck designs. Suitable coatings include but are not limited to aqueous dispersions of anti-skid agents and silicates, latex coatings and adhesives.

(b) Effect of COF Concentration on Torque

Figure 11:
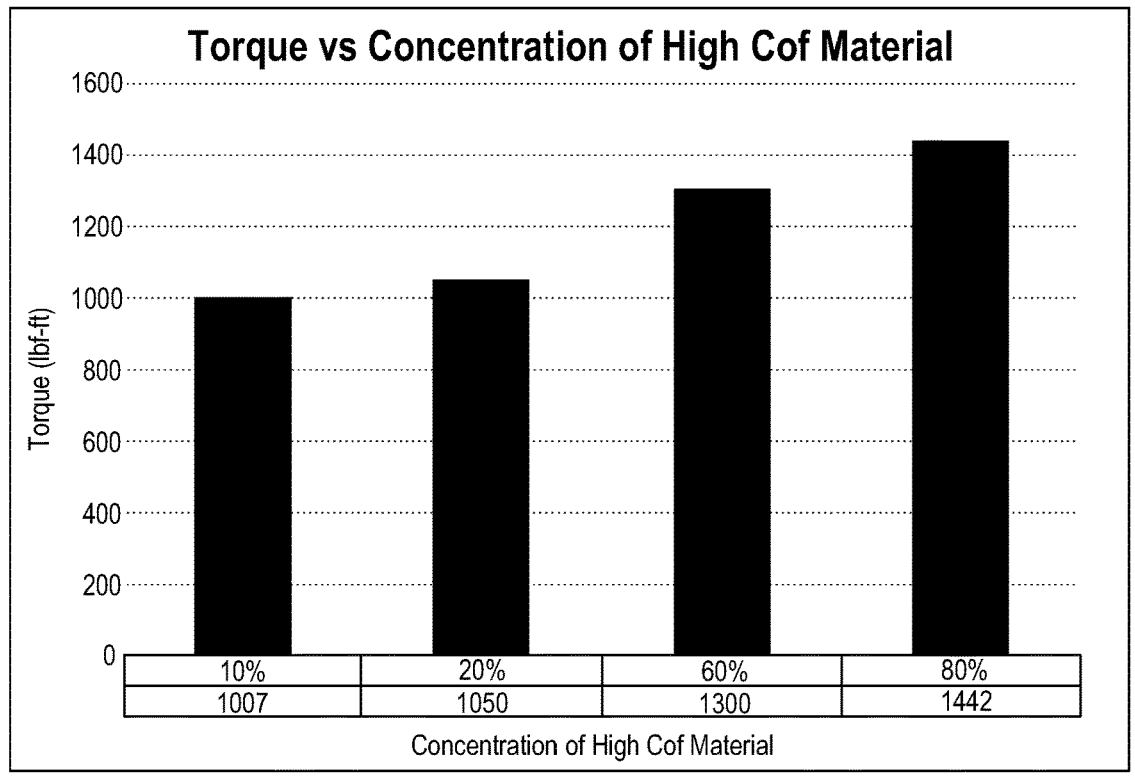
FIG. 11 is a graph showing the relationship between maximum torque and concentration of high COF material.

FIG. 11 is a graph showing the effect of the concentration of high COF material on torque, that is, the effect of the weight percent of high COF material in the coating applied to 100% of the chuck engaging surface area 18 on torque. As the figure shows, for at least one coating/paperboard combination, increasing the concentration of the high COF material in the coating 70 increased torque. Here is the same data in table form:

|  | Concentration of high COF | | | |
| --- | --- | --- | --- | --- |
|  | 10% | 20% | 60% | 80% |
| Torque (lbf-ft) | 1007 | 1050 | 1300 | 1442 |
| Torque (N-m) | 1365 | 1424 | 1763 | 1955 |

(c) Effect of Surface Area Coverage and Coating Pattern on Torque

The coating 70 may be applied to all or a portion of the inner surface 12 of the core 10. For example, the coating 70 may be applied only to the chuck engaging surface 18 near each end 16 of the core 10, or along the entire axial length of the core 10.

Figure 12:
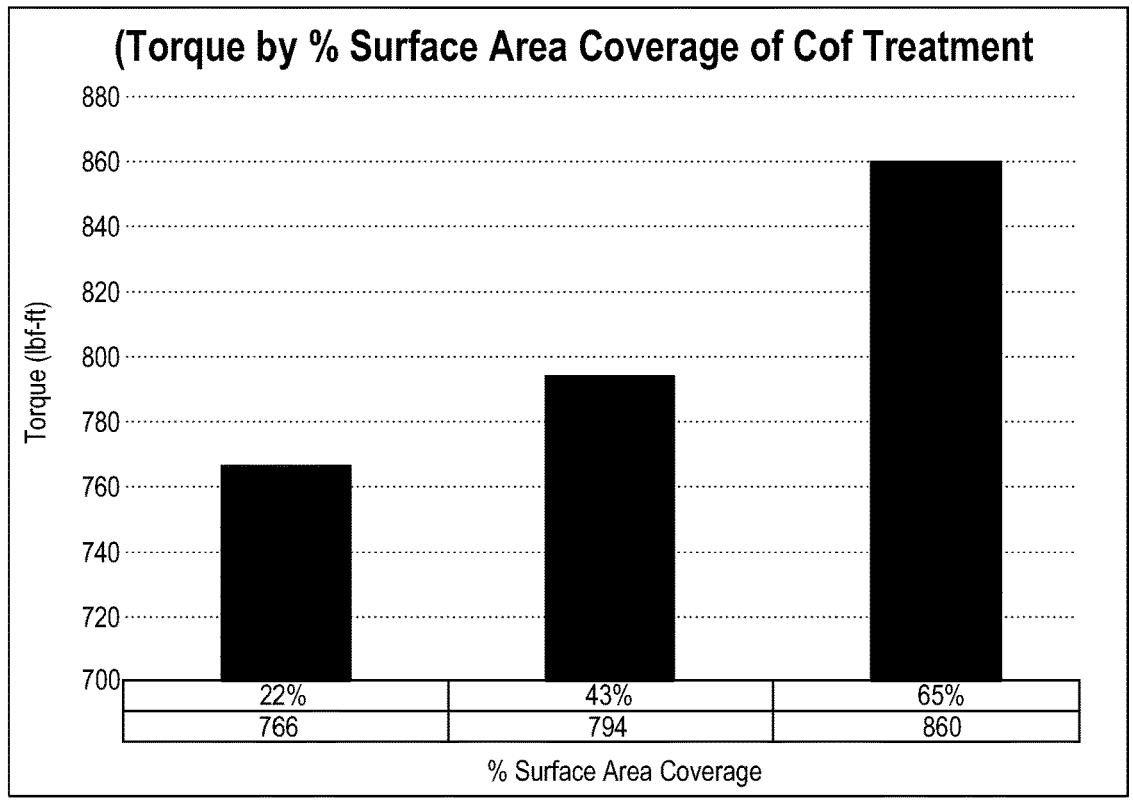
FIG. 12 is a graph showing the relationship between maximum torque and surface area coverage.

FIG. 12 is a graph showing the effect of surface area on torque, and, in particular, the effect of the percent of the core inner surface 12 that is covered with high COF material 70 on maximum torque. The coverage, that is, the area on which the coating 70 is applied expressed as a percentage of the total area of the core inner surface, varied from 22% to 65%. The maximum torque varied from 766 to 860 lbf-ft. As the figure shows, torque performance generally improved with surface area coverage. Here is the same data in table form:

|  | Surface Area Coverage (% core inner surface) | | |
| --- | --- | --- | --- |
|  | 22% | 43% | 65% |
| Torque (lbf-ft) | 766 | 794 | 860 |
| Torque (N-m) | 1039 | 1076 | 1166 |

Figure 13:
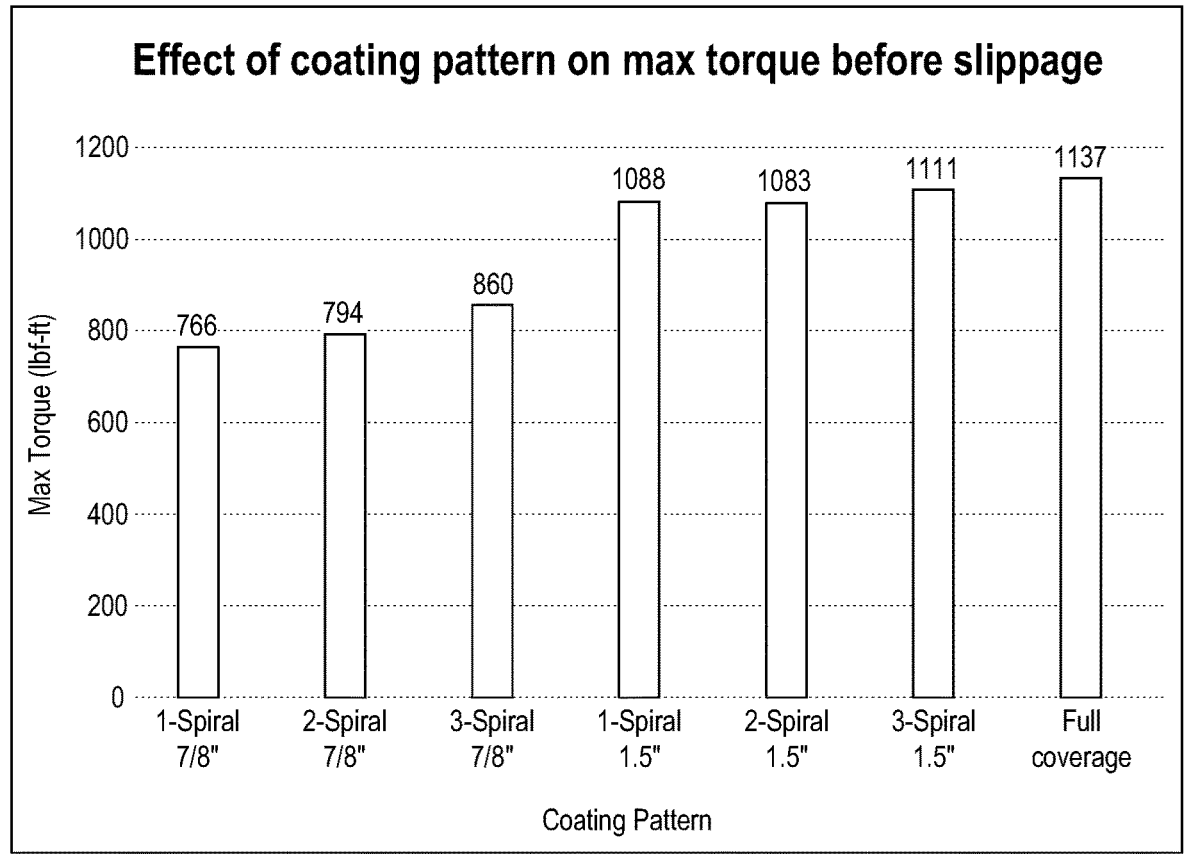
FIG. 13 is a graph showing the relationship between coating pattern and maximum torque.

FIG. 13 is a graph showing the relationship between coating pattern and maximum torque. As previously noted, the coating 70 may be applied to the inner surface 12 of the core 10 in various patterns or configurations. For example, the high COF coating (70) may be applied to the inner surface (12) in a pattern to achieve a desired level of surface area coverage. The coating 70 may be applied in a single spiral pattern (like in FIG. 7), a multiple spiral pattern, in one or more annular rings, or in any suitable pattern. The coating 70 may also be applied only to all or part of the engaging surfaces 18.

In the test results shown in FIG. 13, coating the inner surface 12 of a core 10 with one, two or three 7/8 inch wide spirals resulted in maximum torque values of 766, 794 and 860 lbf-ft respectively. Coating the inner surface 12 of the core 10 with one, two or three 1.5 inch wide spirals resulted in maximum torque values of 1088, 1083 and 1111 lbf-ft respectively. Coating the entire inner surface 12 of the core 10 ("full coverage") resulted in a maximum torque value of 1137 lbf-ft. Here is the same data in table form:

| Coating Pattern | Spiral Width (inches) | Spiral Width (cm) | Torque (lbf-ft) | Torque (N-m) |
| --- | --- | --- | --- | --- |
| 1 spiral | 7/8 | 2.2225 | 766 | 1038 |
| 2 spiral | 7/8 | 2.2225 | 794 | 1076 |
| 3 spiral | 7/8 | 2.2225 | 860 | 1076 |
| 1 spiral | 1.5 | 3.81 | 1088 | 1475 |
| 2 spiral | 1.5 | 3.81 | 1083 | 1468 |
| 3 spiral | 1.5 | 3.81 | 1111 | 1506 |
| Full coverage |  |  | 1137 | 1541 |

Although all of these results may be satisfactory, it may be surmised from this data that fuller coverage results in better core/chuck interaction, at least to a point.

(d) Method of Making an Improved Core

Figure 16:
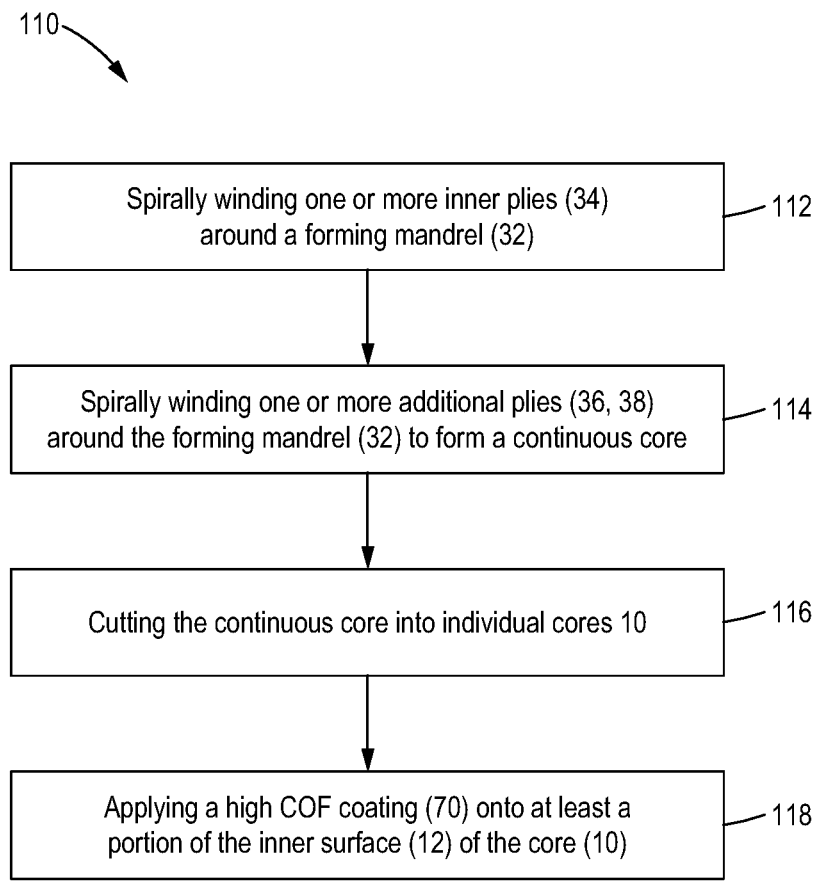
FIG. 16 is a flowchart illustrating a method of making an improved core according to the disclosure.

FIG. 16 is a flowchart illustrating a method 110 of making an improved core 10. The method may comprise the following steps:

Step 112. Spirally winding one or more inner plies (34) around a forming mandrel (32).

Step 114. Spirally winding one or more additional plies (36, 38) around the forming mandrel (32) to form a continuous core that moves axially along the mandrel (32) before coming off the mandrel (32).

Step 116. Cutting the continuous core into individual cores 10, each core (10) having two axially opposed ends (16), an inner surface (12) comprising one or more engaging surfaces near each end (16) and an outer surface (14) adapted to accommodate a material (100) wound therein.

Step 118. Applying a high COF coating (70) onto at least a portion of the inner surface (12).

As noted above, the core 10 may be formed by spirally winding a plurality of plies 34, 36, 38 about a mandrel 32, adhering the plies together to form a continuous core 40, and severing portions or sections of the continuous core 40 to form individual cores 10. A high COF coating 70 is disposed on at least the engaging surfaces 18 of the core 10 in one of several different ways. For instance, the coating 70 may be applied before, during or after the core making process.

If applied before the core making process, the coating 70 should be applied to the inner facing surface of the paper used to make the innermost plies 34.

If applied during the core making process, the coating 70 may be applied either to the inner plies 34 that make up the inner surface 12 prior to winding the plies 34 around the mandrel 32, or to the formed core inner surface 12 as the continuous core 40 moves along the mandrel 32.

If applied after the core making process, that is, after the continuous core 40 is cut into usable individual cores 10, the coating 70 may be applied by any suitable means, including using a rag applicator, rollers, brushes, a squeegee applicator or a spray applicator. Preferably the coating 70 is applied near each end 16 where the chucks 52 engage the core 10.

Preferably the coating 70 is applied on areas where the expanding core engaging elements 52 (chucks, shaft, etc.) are in contact with inside surface 12 of the core 10. In the case of chucks 52, this area generally is near each end 16 of the core 10. With shafts, this area may extend most or the entire length of the core 10. In some cases this area may be just one end 16 of the core 10 if that end experiences more torque (e.g., from a motor and/or brake).

(ii) Mitigating Core Damage Using a Specialty Material for the Inner Plies

In another aspect the method of improving core-chuck interaction involves using a specialty material for the inner ply or plies 34 of the core 10 or the engaging surfaces 18 of the core 10. The specialty material can be a high COF, anti-skid paper or a paper having special properties. The special properties may include thickness, roughness and recycled paper content.

Effect of Paper Density on Torque

Figure 14:
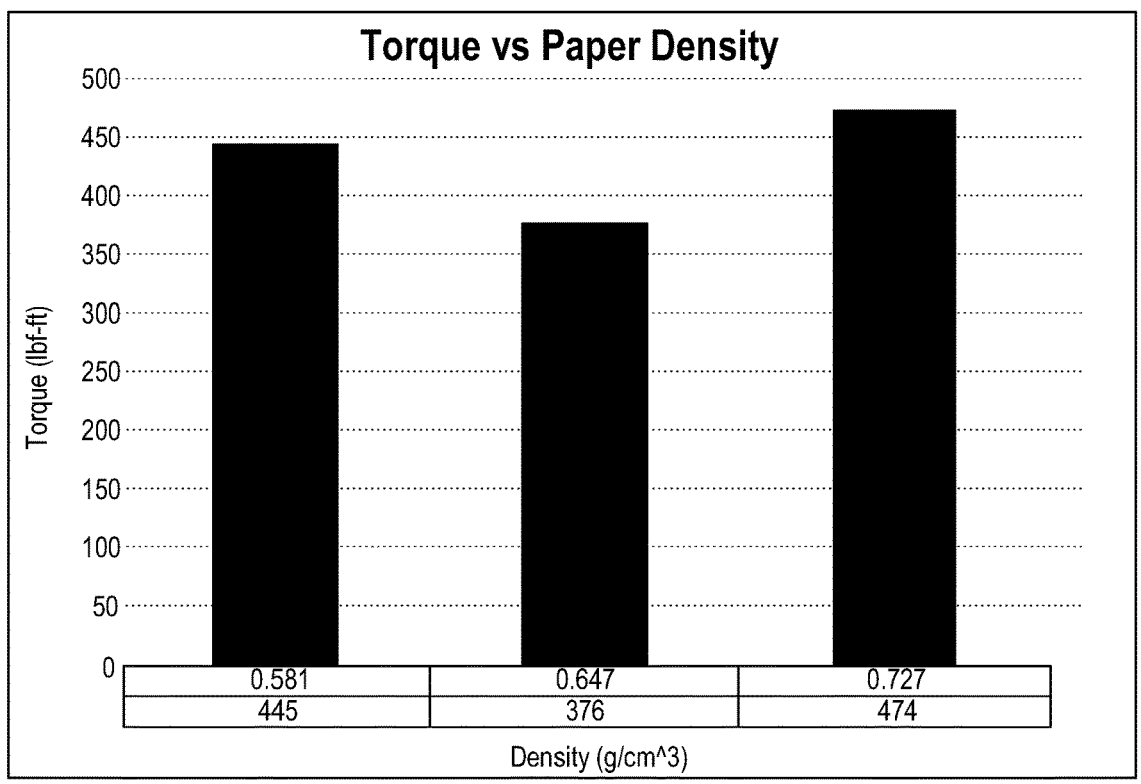
FIG. 14 is a graph showing the relationship between maximum torque and paperboard density.

Tests were conducted to determine the effect of paper density on maximum torque. FIG. 14 is a graph showing the effect of the density of the core inner ply 34 on maximum torque. As the figure shows, in this brief set of tests, torque performance did not correlate well with density of the inner ply 34. Here is the same data in table form:

|  | Density (g/cm$^3$) | | |
| --- | --- | --- | --- |
|  | 0.581 | .647 | .727 |
| Torque (lbf-ft) | 445 | 376 | 474 |
| Torque (N-m) | 602 | 510 | 643 |

Effect of Paperboard Strength on Torque

Figure 15:
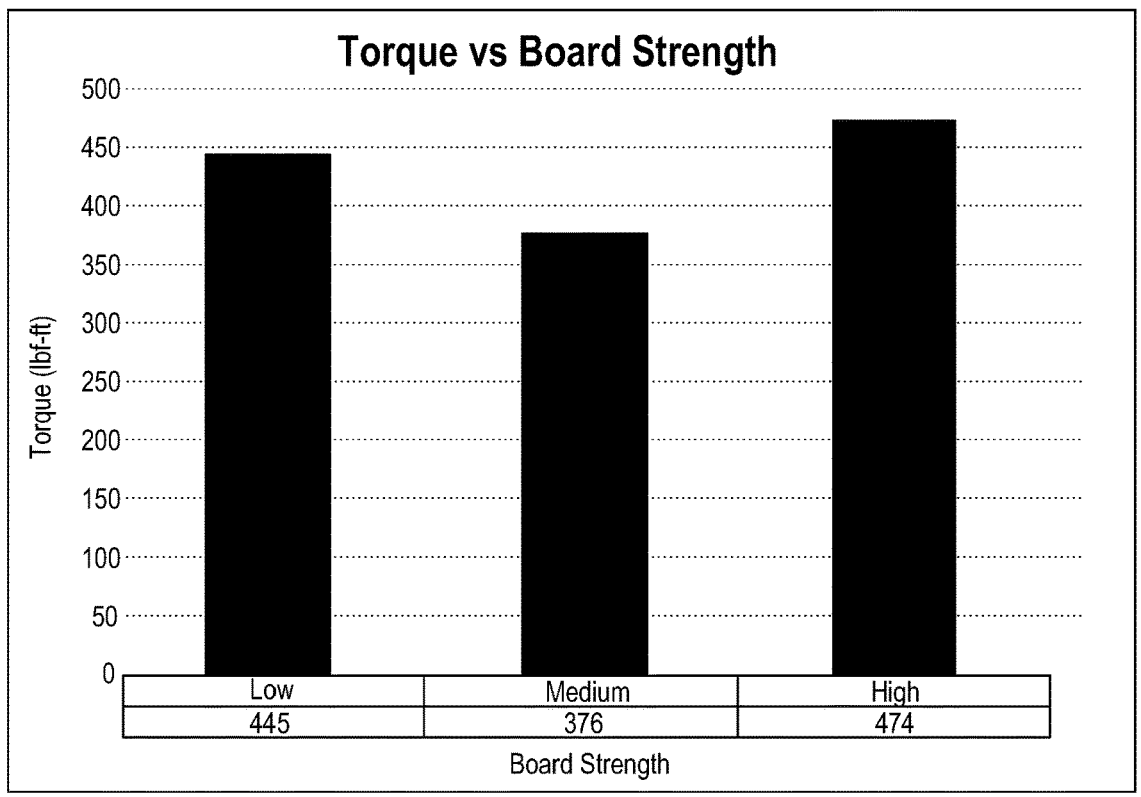
FIG. 15 is a graph showing the relationship between maximum torque and board strength.

Tests were conducted to determine the effect of paperboard strength of the inner ply or plies 34 on maximum torque. FIG. 15 is a graph showing the effect of paperboard strength of the core inner ply 34 on maximum torque. As the figure shows, in this brief set of tests, torque performance did not appear to correlate well with paperboard strength. Here is the same data in table form:

|  | Inner Ply Strength | | |
| --- | --- | --- | --- |
|  | Low | Medium | High |
| Torque (lbf-ft) | 445 | 376 | 474 |
| Torque (N-m) | 602 | 510 | 643 |

There may be a point where the inner ply paper density or paperboard strength is just as important if not more so than the COF between the core 10 and the core engaging elements 52 in mitigating chewout. For instance, the COF between the core 10 and the chuck engaging elements 52 may be increased to such a high level that chuck slippage isn't the primary concern but paper failure is. However, it is believed that this drastically increased level of COF—and thus maximum torque—is outside the normal operating levels in most paper converting operations.

(iii) Mechanically or Chemically Treating the Core Inner Surface

In another aspect, the method of improving core-chuck interaction involves mechanically or chemically treating the core inner surface or just the engaging surfaces of the core to alter the coefficient of friction (COF). For example, the method may comprise mechanically or chemically treating the engaging surfaces 18 of a core 10 to increase the COF of the engaging surfaces 18, thereby increasing the maximum torque between the core 10 and the core engaging elements 52.

In one aspect, the inner surface 12 of the core 10 may be mechanically treated during or after the core making process, such as by mechanical abrasion to increase the roughness of the inner surface 12.

In another aspect, the inner surface 12 of the core 10 may be chemically treated to increase the COF of the inner surface 12 during or after the core 10 is made. The treatment may involve chemically treating the material, such as paperboard, that forms the inner ply or plies 34 prior to making the core 10.

(iv) Placing a Sheet of High COF Material between the Core and the Core Engaging Element(s)

In yet another aspect the method of improving core-chuck interaction involves placing or positioning a loose layer of material between the inside surface 12 of the core 10 and the core engaging elements 52. In such cases the loose layer may be removed after winding.

INDUSTRIAL APPLICABILITY

The present disclosure relates to improved cores and methods of improving the interaction between cores and core engaging elements to reduce or eliminate damage to the core or operational problems. The cores and methods may be useful in numerous industries, including the paper industry (for example, with sheeting operations (fine paper, converting)), the corrugating industry, the coiled metal industry, and any industry involving winding or unwinding of materials carried on cores.

For example, in the paper industry where cores are often mounted at either end on chucks, it may be desirable to increase the coefficient of friction (COF) between the inner surface of the core and the chucks, either by increasing the COF across the entire inner surface of the core or just at the chuck engaging surfaces.

Likewise, in sheet metal carrying applications where Metallan™ cores are often mounted on a shaft, it may be desirable to increase the coefficient of friction (COF) along the entire inner surface of the core 10 or along less than the entire inner surface 12, such as along just the middle portion of the inner surface 12 between the core ends 16.

In industries that employ differential winding shafts, such as certain paper, film, and tape industries, it may be desirable to adjust the coefficient of friction (COF) of each individual core to achieve a desired level of web tension for each core during winding or unwinding. Differential shafts are shafts having sections that can move (rotate) relative to each other. Typically, multiple cores are placed on the various sections of the shaft at the same time. The differential shaft allows relative movement between the cores, and also allows relative movement or slippage between each core and its corresponding section of the shaft. In these applications it may be desirable to control the COF of each core using the techniques described herein to achieve the desired level of web tension for each core during winding or unwinding.

The cores and methods described herein may offer improved performance for all chuck types, including chucks having smooth expandable elements, non-smooth expandable elements or no expandable elements. Examples of non-smooth expandable elements include those that are profiled, roughened or serrated. While core engaging elements having smooth surfaces are more challenging, problems can also occur for example with elements including those that are profiled, roughened or serrated.

It is understood that the embodiments of the invention described above are only particular examples which serve to illustrate the principles of the invention.

Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. An improved core for mounting on one or more core engaging elements, the core adapted for winding and unwinding material thereon, the core being hollow and cylindrical and having an inner surface and an outer surface adapted to accommodate the material, the core having a length and two axially opposed ends with engaging surfaces proximate the opposed ends that are engaged by the engaging elements, wherein the improvement comprises:

a high coefficient of friction (high COF) coating disposed on the inner surface of the core, the high COF coating adapted to increase the coefficient of friction (COF) between the inner surface of the core and the core engaging elements, wherein the high COF coating is applied to less than all of the surface area of the engaging surfaces proximate the opposed ends.

2. The core of claim 1 wherein:

the high COF coating is selected from the group consisting of aqueous dispersions of anti-skid agents and silicates, latex coatings and adhesives.

3. The core of claim 1 wherein:

the high COF coating comprises a high COF material; and the weight percent of high COF material in the high COF coating is between 10% and 80%.

4. The core of claim 1 wherein:

the high COF coating is applied to the inner surface in a pattern to achieve a predetermined level of surface area coverage.

5. The core of claim 1 wherein:

the high COF coating is applied to the inner surface in one or more spiral patterns.

6. The core of claim 1 wherein:

the one or more core engaging elements comprise a pair of chucks.

7. The core of claim 1 wherein:

the one or more core engaging elements comprises a shaft extending axially through the entire core.

8. A method of making a hollow cylindrical core, the core having a length, the method comprising the steps of:

spirally winding one or more inner plies around a forming mandrel;

spirally winding one or more additional plies around the forming mandrel to form a continuous core that moves axially along the mandrel before coming off the mandrel;

cutting the continuous core into individual cores, each core having two axially opposed ends, an inner surface comprising one or more engaging surfaces near each end and an outer surface adapted to accommodate a material wound therein; and applying a high COF coating to the inner surface of the core, wherein the inner surface has engaging surfaces proximate axially opposed ends of the core that are engaged by the engaging elements on which the core will be mounted, and wherein the high COF coating is applied to less than all of the surface area of the engaging surfaces.

9. The method of claim 8 wherein:
the high COF coating is applied to the inner surface in the form of a pattern.

10. The method of claim 8 wherein:
the high COF coating is applied to the inner surface in one or more spiral patterns.

11. The method of claim 8 wherein:
the high COF coating is applied to the inner surface by spraying.

12. An improved core for mounting on one or more core engaging elements, the core adapted for winding and unwinding material thereon, the core being hollow and cylindrical and having an inner surface having a constant diameter and an outer surface adapted to accommodate the material, the core having a length and two axially opposed ends, wherein the improvement comprises:

a high coefficient of friction (COF) coating disposed directly on the inner surface of the core, the high COF coating adapted to increase the coefficient of friction (COF) between the inner surface of the core and the core engaging elements, wherein the inner surface has engaging surfaces proximate the axially opposed ends of the core that are engaged by the engaging elements on which the core will be mounted, and wherein the high COF coating is applied to less than all of the surface area of the engaging surfaces.

13. The core of claim 12 wherein:
the core is formed of paperboard.

14. A system for improving core-chuck interaction, the system comprising:
one or more core engaging elements; and
an improved core for mounting on the one or more core engaging elements, the core adapted for winding and unwinding material thereon, the core being hollow and cylindrical and having a length extending from one end to an axially opposed opposite end, the core having an outer surface adapted to accommodate the material and an inner surface extending the length of the core and having a constant diameter, the inner surface directly contacting the one or more core engaging elements, the core further comprising a high coefficient of friction (COF) coating disposed on the inner surface of the core, the high COF coating adapted to increase the coefficient of friction (COF) between the inner surface of the core and the one or more core engaging elements, wherein the inner surface has engaging surfaces proximate axially opposed ends of the core that are engaged by the engaging elements on which the core will be mounted, and wherein the high COF coating is applied to less than all of the surface area of the engaging surfaces.

15. An improved core for mounting on one or more core engaging elements, the core comprising spirally wound paper and having an inner surface and an outer surface adapted to accommodate sheet material wound thereon, the core having two axially opposed ends, the core comprising one or more inner plies that form engaging surfaces, wherein the improvement comprises:

all or part of the inner surface is abraded to increase the roughness of the inner surface.

16. The core of claim 15 wherein:
the entire inner surface is mechanically treated.

17. The core of claim 15 wherein:
only the engaging surfaces are mechanically treated.

18. The core of claim 15 wherein:
all or part of the inner surface is altered by mechanical abrasion.

19. An improved core for mounting on one or more core engaging elements, the core comprising spirally wound paper and having an inner surface and an outer surface adapted to accommodate sheet material wound thereon, the core having two axially opposed ends, the core comprising one or more inner plies that form engaging surfaces proximate the axially opposed ends of the core that are engaged by the one or more core engaging elements, wherein the improvement comprises:

chemically treating the one or more inner plies prior to making the core, wherein the one or more inner plies are chemically treated on less than all of a surface area of the engaging surfaces.

20. The core of claim 19 wherein:
the engaging surfaces are formed of paperboard; and
the paperboard that forms the engaging surfaces is chemically treated.

* * * * *